US012448840B2

(12) United States Patent
Heissenberg

(10) Patent No.: US 12,448,840 B2
(45) Date of Patent: Oct. 21, 2025

(54) ADJUSTABLE VERTICAL BARRIER FOR A RETRACTABLE SCREEN

(71) Applicant: ESS Manufacturing, Inc., Jensen Beach, FL (US)

(72) Inventor: Michael Heissenberg, Port St. Lucie, FL (US)

(73) Assignee: ESS Manufacturing, Inc., Jensen Beach, FL (US)

( * ) Notice: Subject to any disclaimer, the term of this patent is extended or adjusted under 35 U.S.C. 154(b) by 192 days.

(21) Appl. No.: 17/663,486

(22) Filed: May 16, 2022

(65) Prior Publication Data

US 2023/0366268 A1 Nov. 16, 2023

(51) Int. Cl.
*E06B 9/17* (2006.01)
*E06B 9/52* (2006.01)

(52) U.S. Cl.
CPC .......... *E06B 9/522* (2013.01); *E06B 9/17076* (2013.01)

(58) Field of Classification Search
CPC .... E06B 9/17046; E06B 9/17076; E06B 9/40; E06B 9/42; E06B 9/08; E06B 9/11; E06B 9/17; E06B 7/18; E06B 7/20; E06B 9/522
See application file for complete search history.

(56) References Cited

U.S. PATENT DOCUMENTS 1,682,389 A * 8/1928 Ludeke .................... E06B 7/20 49/308
2,344,278 A * 3/1944 Balousek .................. E06B 7/20 49/307
2,433,331 A * 12/1947 Beck ......................... E06B 7/20 49/310
3,453,780 A * 7/1969 Thompson ................ E06B 7/18 49/482.1
6,508,292 B1 * 1/2003 Saperas ..................... E06B 9/54 160/272
8,607,841 B2 12/2013 Hayashiguchi
9,382,752 B1 7/2016 Zubay
9,719,292 B1 8/2017 James et al.
11,326,395 B2 5/2022 Heissenberg
2006/0137836 A1 6/2006 Harbison
2019/0284874 A1 9/2019 Healam
2019/0323286 A1 10/2019 Menendez

FOREIGN PATENT DOCUMENTS

KR 19980080868 * 11/1998

OTHER PUBLICATIONS

Machine translation KR19980080868 (Year: 1998).*

* cited by examiner

*Primary Examiner* — Daniel P Cahn
*Assistant Examiner* — Jeremy C Ramsey
(74) *Attorney, Agent, or Firm* — Dority & Manning, P.A.

(57) ABSTRACT

An adjustable vertical barrier placed at the bottom of a retractable screen to adjust for an uneven floor surface comprised of a housing for attached on one end of the screen enclosure and weighted lift bar within the housing for attachment of a felt gasket, whereby the lift bar is freely vertically movable within the housing so that the felt gasket conforms to the contour of a floor surface and the lift bar is retained within housing a foot on the lift bar cooperates with a first notch within the housing.

5 Claims, 4 Drawing Sheets

ADJUSTABLE VERTICAL BARRIER FOR A RETRACTABLE SCREEN

FIELD OF THE INVENTION

The present invention relates to the field of retractable screens and, more particularly, to an adjustable vertical barrier placed at the bottom of a retractable screen to adjust for an uneven floor surface.

BACKGROUND OF THE INVENTION

Screening is commonly used to allow individuals to enjoy the outdoors by providing some of the benefits of indoor living. Screens may be used to keep bugs out of a living space, provide shading, reduce wind speed, operate as a wall member, and so forth. By way of example, a screen may have sized openings that can prevent flies, mosquitos or Ceratopogonidaes (no-see-ums) from entering an outdoor living space such as a patio or pool area. A screen may also be adapted to provide a bug free garage area, effectively extending the living area of a home when weather permits.

A home may include an outdoor space that can extend the living space of the home by screening of the area. For instance, a garage can be used if the flying and crawling insects are kept out. Similarly, a screened in covered patio makes the area inhabitable even on the most bug filled nights. There are many times wherein a screen is not needed and preferably stored away. For instance, when conditions are right and minimal bugs exist, a screened in patio or garage is more enjoyable without a screen opening. However, when conditions are ripe for bugs, the same patio or garage may be uninhabitable. Screens are especially beneficial during twilight hours when the patio or garage space is illuminated, as bugs are naturally attracted to light.

Sunlight hours are not without their need of screening; a screen can provide shade protection from the sun, yet allow a flow of air to pass through the space.

A problem with screening is the sealing around the edges to providing so many benefits, improvements in screen attachment becomes important. A preferred method of storing large screens for patios and garages is by use of a retractable screen that rolls from a cylinder positioned along a header placed at the top of an opening to be protected. The edges of the screen are secured to a track that essentially prevents bugs and the like from going around the edges of the screen. One problem with known retractable screens is that the tracks used to capture the edge of the screens can bind, making the deployment and/or retraction difficult.

Applicant's U.S. Pat. No. 11,326,395 discloses a retractable screen device for a framed opening employing a frame track fastened to each side support of the framed opening. The frame track forming a compartment for receipt of a guide rail with a decompression gasket positioned between the frame track and the guide rail. A screen mounted on a horizontally disposed rotatable shaft secured to a header of the opening has laterally opposed side edges with an elongated flexible protrusion secured along the length of each side edge. The guide rail receives and guides the screen protrusion along a longitudinal direction, and the decompression gasket allows the guide rail to traverse the frame track side walls to permit the screen to flex while maintaining a consistent tension on the screen.

U.S. Patent Publication 2006/0137836 discloses a sealing curtain assembly having a pair of tracks attached to opposite sides of an opening. Each track includes a spring system which urges the tracks outwardly to maintain the curtain taut.

U.S. Pat. No. 8,607,841 discloses a screen device having inner rails that are embedded inside fixed guide rails which guide protrusions at side edges of a screen which is wound via a take-up shaft.

U.S. Pat. No. 9,719,292 discloses a magnetic track assembly employing magnets. A first magnet is disposed within an aluminum channel, and a screen receiver is disposed within the compartment including a second magnet arranged facing the first magnet.

U.S. Pat. No. 9,382,752 discloses a roll down vertical screen, panel or shutter system (such as used for protecting against insects, solar winds, hurricanes, rain or providing privacy and security) having a bottom edge-weight bar and self adjusting blade that automatically adjusts to variable pitched surfaces to seal a gap resulting from a roll down screen's bottom horizontal weight bar and a floor surface that is contoured or pitched on a non-horizontal direction running parallel to the direction of the weight bar. The self-adjusting weight bar for variable pitched surfaces generally including: a weight bar body, a self-adjusting blade, customizable attachment point, variable weights, and anti-warping stiffeners. These elements are to be found as the lowest element of a roll down screen or shutter. The extended elongated weight bar is attached at the bottom edge of a screen and includes a hollow chamber that receives an L-shaped blade that is movably mounted within the hollow chamber so that the blade can conform to the lift angle or compound contour of the floor.

SUMMARY OF THE INVENTION

Disclosed is an adjustable vertical barrier for a retractable screen comprising a housing and a vertically adjustable weighted lift bar. The housing having at least two opposing sidewalls, an upper open surface, a lower open surface, and enclosing a lift bar enclosure and screen mesh enclosure separated by a traverse wall. The screen mesh enclosure being vertically positioned above the lift bar enclosure having a cross-section larger than said upper open surface cross-section to attach and receive a screen edge within. The lift bar enclosure having a first notch disposed within an interior sidewall thereof and positioned above the lower open surface. The weighted lift bar having opposing side panels, a top edge, and a bottom edge, whereby the top edge includes a foot extending beyond one of the side panel and the bottom edge is sized to receive and attach a felt gasket. The weighted lift bar is freely vertically movable within the lift bar enclosure so that the felt gasket conforms to the contour of a floor surface and the lift bar is retained within the lift bar enclosure when the foot on the lift bar cooperates with the first notch in lift bar enclosure.

It is an objective of the invention to provide a adjustable vertical barrier for a retractable screen to accommodate an uneven floor.

Still another objective of the invention is to provide a device that accommodates uneven horizontal screen positions and uneven vertical screen surfaces.

Yet still another objective of the invention is to provide a barrier that can adjusted to various spaces between the screen when it meets with the floor.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE INVENTION

Figure 1:
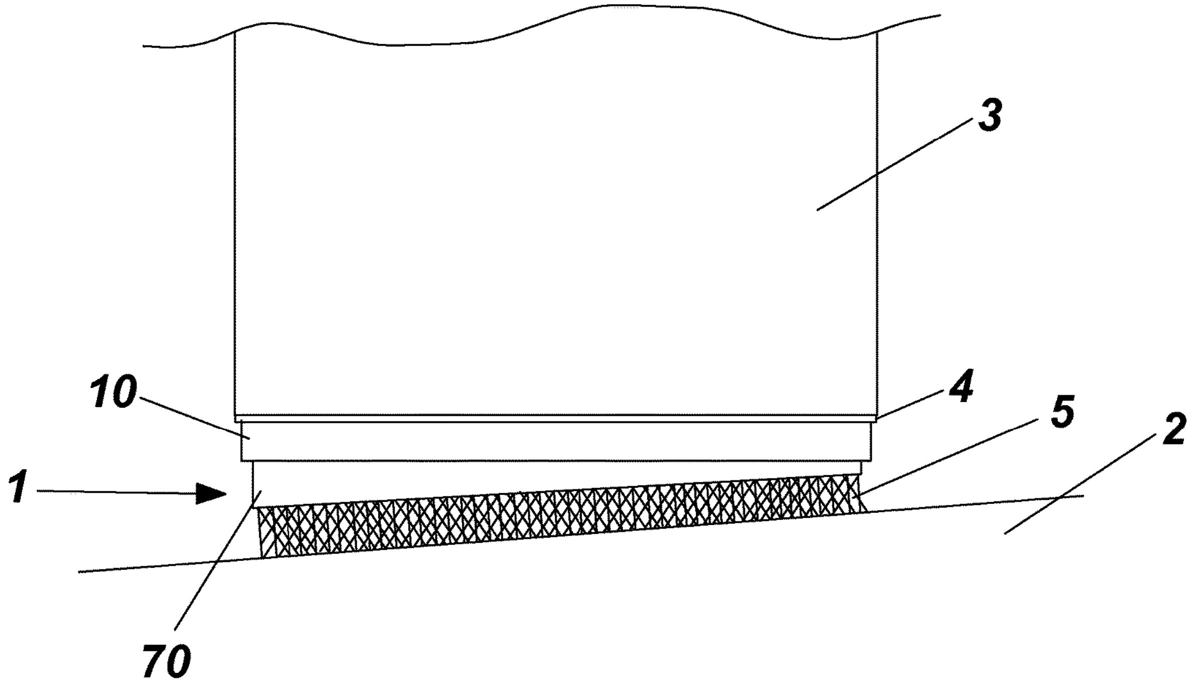
FIG. 1 is a pictorial representation of the adjustable vertical barrier apparatus with a screen enclosure and felt gasket attached on an uneven floor surface.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Figure 2:
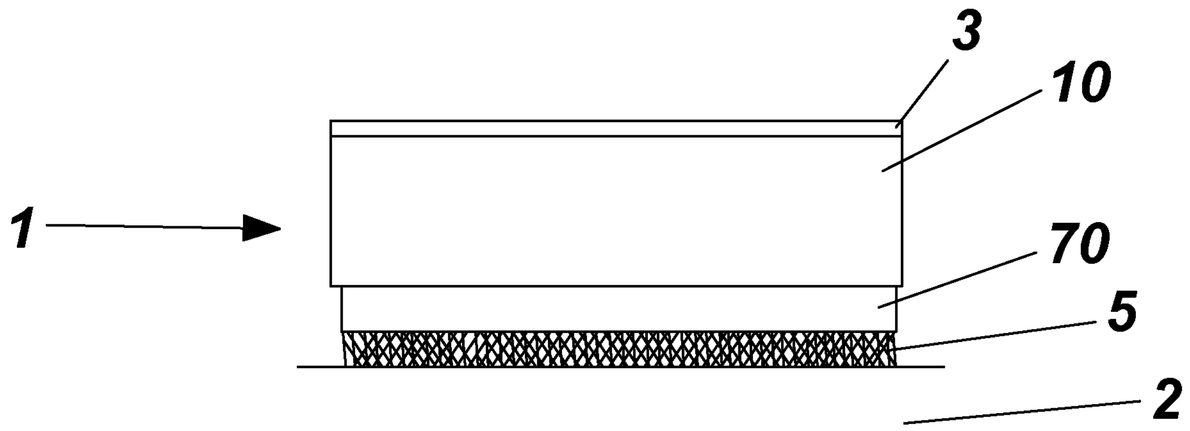
FIG. 2 is a front view of the adjustable vertical barrier apparatus on an even floor surface.
Figure 3:
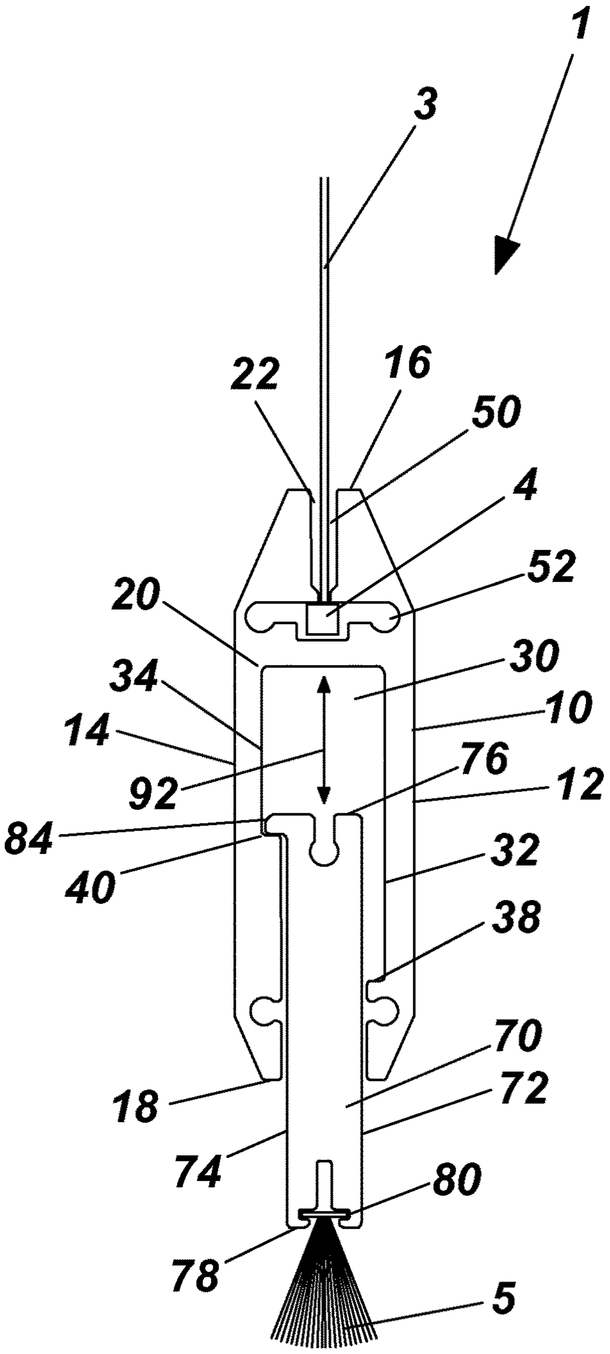
FIG. 3 is a cross-sectional side view of the adjustable vertical barrier apparatus in a first segmented area.
Figure 4:
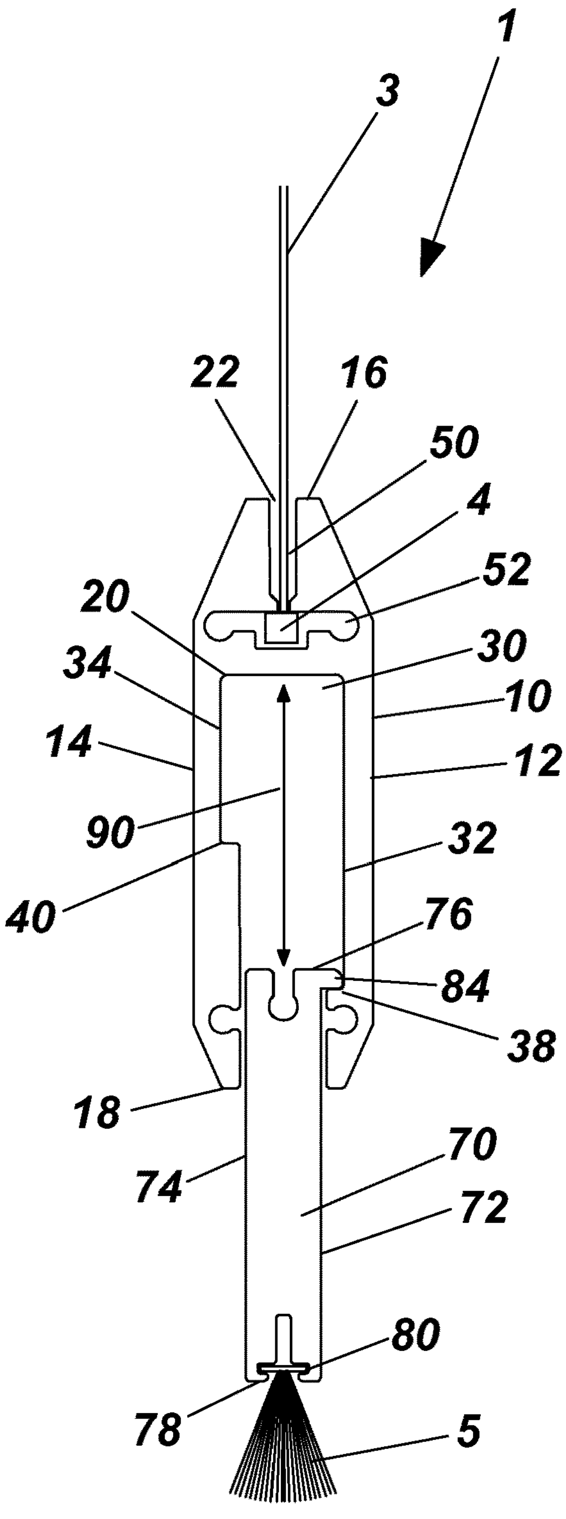
FIG. 4 is a cross-sectional side view of the adjustable vertical barrier apparatus in a second segmented area.

As shown in FIGS. 1 and 2, an adjustable vertical barrier apparatus 1 placed at the bottom 7 of a screen enclosure 3 to adjust for an uneven floor surface 2. The lift bar 70 free moves about the housing 10 of the adjustable vertical barrier apparatus 1 to adjust for an uneven floor surface 2. As shown in FIGS. 3 and 4, the adjustable vertical barrier apparatus 1 is comprised of a housing 10 and a lift bar 70. The housing 10 has at least two opposing sidewalls, 12 and 14, an upper open surface 16, and a lower open surface 18. The housing 10 encloses a lift bar enclosure 30 and screen mesh enclosure 50, wherein the screen mesh enclosure 50 and lift bar enclosure 30 are separable by a transverse wall 20. The screen mesh enclosure 50 is vertically positioned above the lift bar enclosure 30. The screen mesh enclosure 50 has an opening defined by the upper open surface 16. The screen mesh enclosure 50 is sized to attached and receive a screen edge 4 within. More specifically, the screen mesh enclosure 50 has a cross-section 52 larger than the upper open surface cross-section 22 to allow the screen edge 4 to be hemmed within. A screen edge 4 is generally comprised a rope, chain, zipper, or formed extrusion, therefore the screen edge 4 is restricted within the screen mesh enclosure 50 because of the cross-section disparity within the screen mesh enclosure 50.

The lift bar enclosure 30, which is separated from the screen mesh enclosure 50 by a traverse wall 20 and is positioned vertically below the screen mesh enclosure 50. The lift bar enclosure 30 includes an opening defined by the lower open surface 18. The lift bar enclosure 30 further includes a first notch 38 disposed within an interior sidewall 32 of lift bar enclosure. The first notch 38 is positioned above the lower open surface 18. Additionally, the lift bar enclosure 30 can include a second notch 40 disposed within at least one side of the interior side panel 34 of the lift bar enclosure 30 above the first notch 38 and below the traverse wall 20. The first and second notches, 38 and 40, are sized to cooperate with a foot 84 on the lift bar 70.

A lift bar 70 is encased within the lit bar enclosure 30. The lift bar 70 is weighted. The lift is freely vertically movable within the lift bar enclosure 30 so that the felt gasket 5 conforms to the contour of a floor surface 2. The lift bar 70 has opposing side panels, 72 and 74, a top edge 76, and a bottom edge 78. The top edge 76 includes a foot 84 extending beyond one side panel 74 of the lift bar 70. The bottom edge 78 sized to receive and attached a felt gasket 5. More specifically, the bottom edge 78 of the lift bar 70 includes a pair of slots 80 to receive and attach the felt gasket 5. The lift bar 70 is segmentably movable between the traverse wall 20 and the first notch 38, a first segmented area 90, and between the traverse wall 20 and the second notch 40, a second segmented area 92. The first segmented area 90 being longer in length that the second segmented area 92. The lift bar 70 is retained within the lift bar enclosure 30 when the foot 84 on the lift bar 70 cooperates with the first or second notch, 38 and 40, on the lift bar enclosure 30. The lift bar 70 is rotated from one interior side wall 32 to the other interior side wall 34 in order to move from the first segmented area 90 to the second segmented area 92 or from the first notch 38 to the second notch 40, shown in FIGS. 3 and 4. Using the second segmented area 92 is preferred in instances where the gap between the second notch 40 and the traverse wall 20 is less than or equal the gap between the lower open surface 18 of the housing 10 and the uneven floor 2. Using the first segmented area 90 is preferred in instances where the gap between the first notch 38 and the traverse wall 20 is less than or equal the gap between the lower open surface 18 of the housing 10 and the uneven floor 2 or greater than the second segmented area 90. It is contemplated that the first segmented area 90 is between 0-1.5 in and the second segmented area 92 is between 0-0.75 in.

The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one." The use of the term "or" in the claims is used to mean "and/or" unless explicitly indicated to refer to alternatives only or the alternative are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features. Furthermore, a device or structure that is configured in a certain way is configured in at least that way, but may also be configured in ways that are not listed.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

All patents and publications mentioned in this specification are indicative of the levels of those skilled in the art to which the invention pertains. One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims.

What is claimed is:

1. An adjustable vertical barrier apparatus placed at the bottom of a screen enclosure to adjust for an uneven floor surface, said adjustable vertical barrier apparatus comprising:

a housing having two opposing sidewalls, an upper open surface, and a lower open surface, said housing enclosing a lift bar enclosure and screen mesh enclosure, said screen mesh enclosure being vertically positioned above said lift bar enclosure, wherein said screen mesh enclosure and said lift bar enclosure are separated by a transverse wall, said screen mesh enclosure having a cross-section larger than said upper open surface cross-section, said screen mesh enclosure sized to attach and receive a screen edge within, said lift bar enclosure having a first notch formed adjacent said lower open surface along a first interior sidewall of said lift bar enclosure and a second notch formed along a second interior sidewall of said lift bar enclosure positioned a distance above said lower open surface; and a lift bar having opposing side surfaces, a top edge, and a bottom edge, said top edge including a foot extending beyond one of said side surfaces for engaging either said first notch or said second notch, said bottom edge sized to receive and attach a felt gasket;

wherein said lift bar is freely vertically movable within said lift bar enclosure so that said felt gasket conforms to the contour of a floor surface and said lift bar is retained within said lift bar enclosure when said foot on said lift bar cooperates with said first notch on said lift bar enclosure allowing said lift bar to extend up through a first segmented area whereby reversing said lift bar allows said lift bar to cooperate with said second notch on said lift bar enclosure allowing said lift bar to extend through a second segmented area; and wherein said second notch is sized to cooperate with said foot on said lift bar whereby said lift bar is freely vertically movable between said transverse wall and said second notch forming said second segmented area and said lift bar is freely vertically movable between said transverse wall and said first notch forming said first segmented area.

2. The adjustable vertical barrier apparatus placed at the bottom of the screen enclosure of claim 1, wherein said lift bar is weighted.

3. The adjustable vertical barrier apparatus placed at the bottom of the screen enclosure of claim 1, wherein said screen mesh enclosure and said lift bar enclosure are separable by a transverse wall.

4. The adjustable vertical barrier apparatus placed at the bottom of the screen enclosure of claim 1, wherein said first segmented area is less than 1.5 inches.

5. The adjustable vertical barrier apparatus placed at the bottom of the screen enclosure of claim 1, wherein said second segmented area is less than 0.75 inches.

* * * * *